US011042071B2

United States Patent
Yu et al.

(10) Patent No.: US 11,042,071 B2
(45) Date of Patent: Jun. 22, 2021

(54) WATERPROOF DISPLAY APPARATUS AND FORMING METHOD THEREOF

(71) Applicant: E Ink Holdings Inc., Hsinchu (TW)

(72) Inventors: Chin-Chi Yu, Hsinchu (TW);
Chih-Chun Chen, Hsinchu (TW);
Shi-Lin Li, Hsinchu (TW);
Hsin-Chung Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 652 days.

(21) Appl. No.: 15/592,213

(22) Filed: May 11, 2017

(65) Prior Publication Data
US 2018/0095309 A1 Apr. 5, 2018

(30) Foreign Application Priority Data

Sep. 30, 2016 (CN) .......................... 201610864000.5

(51) Int. Cl.
*G02F 1/167* (2019.01)
*G02F 1/16756* (2019.01)
*G02F 1/1339* (2006.01)

(52) U.S. Cl.
CPC ........ *G02F 1/16756* (2019.01); *G02F 1/1339* (2013.01); *G02F 1/167* (2013.01); *G02F 2201/50* (2013.01)

(58) Field of Classification Search
CPC .. G02F 1/133308; G02F 1/1339; G02F 1/167; G02F 2001/133311; G02F 2201/50; G02F 1/16756
See application file for complete search history.

(56) References Cited

U.S. PATENT DOCUMENTS

| 5,903,328 A | 5/1999 | Greene et al. |
| 6,057,898 A | 5/2000 | Itoh et al. |
| 6,989,800 B2 | 1/2006 | McLaughlin |
| 7,551,245 B2 | 6/2009 | Ben-Shalom et al. |
(Continued)

FOREIGN PATENT DOCUMENTS

| CN | 101276119 A | 10/2008 |
| CN | 101356467 A | 1/2009 |
(Continued)

OTHER PUBLICATIONS

Corresponding Taiwanese Notice of Allowance dated May 31, 2017.
Corresponding Chinese office action dated May 13, 2020.

*Primary Examiner* — Balram T Parbadia
(74) *Attorney, Agent, or Firm* — CKC & Partners Co., LLC

(57) ABSTRACT

A waterproof display apparatus includes a bottom waterproof structure, a plurality of driving substrates, a panel laminate (FPL) and a top waterproof structure. The bottom waterproof structure has a first edge. The driving substrates are disposed on the bottom waterproof structure and defining a gap between adjacent driving substrates. The gap has opposite top and bottom portions. The FPL covers the driving substrates and includes a display medium layer therein. The top waterproof structure covers the FPL and has a second edge. The first and second edges are joined in a waterproof manner. The bottom portion of the gap is sealed by the bottom waterproof structure, and the top portion of the gap is sealed by the FPL or the top waterproof structure such that the gap is empty.

23 Claims, 12 Drawing Sheets

(56) References Cited

U.S. PATENT DOCUMENTS

| | | | | |
|---|---|---|---|---|
| 7,941,196 B2* | 5/2011 | Kawasaki | ............... | H04M 1/18 |
| | | | | 455/575.8 |
| 8,054,400 B2 | 11/2011 | Tsubokura et al. | | |
| 8,093,812 B2 | 1/2012 | Makino et al. | | |
| 8,299,707 B2* | 10/2012 | Liu | ............... | H01J 31/127 |
| | | | | 313/512 |
| 8,553,316 B2* | 10/2013 | Tsai | ............... | G02B 26/026 |
| | | | | 359/296 |
| 8,564,950 B2* | 10/2013 | Rayner | ............... | B65D 85/00 |
| | | | | 361/679.55 |
| 8,780,437 B1* | 7/2014 | Lo | ............... | G02F 1/167 |
| | | | | 359/296 |
| 8,976,081 B2 | 3/2015 | Rao et al. | | |
| 2011/0006661 A1* | 1/2011 | Liu | ............... | H01J 9/261 |
| | | | | 313/307 |
| 2011/0228192 A1* | 9/2011 | Hollaway | ............... | G02F 1/133308 |
| | | | | 349/58 |
| 2012/0026209 A1* | 2/2012 | Wang | ............... | G09G 3/344 |
| | | | | 345/690 |
| 2012/0087002 A1* | 4/2012 | Hsieh | ............... | G02F 1/1679 |
| | | | | 359/296 |
| 2013/0201548 A1* | 8/2013 | Wu | ............... | G02F 1/167 |
| | | | | 359/296 |
| 2014/0022623 A1* | 1/2014 | Yen | ............... | G02F 1/133603 |
| | | | | 359/296 |
| 2015/0055034 A1* | 2/2015 | Pipitone | ............... | G02F 1/13338 |
| | | | | 349/12 |
| 2016/0116817 A1* | 4/2016 | Wu | ............... | G02B 1/14 |
| | | | | 359/296 |
| 2016/0254836 A1* | 9/2016 | Alsberg | ............... | H04B 1/3888 |
| | | | | 455/575.8 |
| 2017/0038801 A1* | 2/2017 | Lee | ............... | G06F 1/1656 |

FOREIGN PATENT DOCUMENTS

| | | |
|---|---|---|
| CN | 202210196 U | 5/2012 |
| CN | 103246121 A | 8/2013 |
| CN | 103455187 A | 12/2013 |
| CN | 203573592 U | 4/2014 |
| TW | I529519 B | 4/2016 |
| TW | M526764 U | 8/2016 |

* cited by examiner

WATERPROOF DISPLAY APPARATUS AND FORMING METHOD THEREOF

RELATED APPLICATIONS

This application claims priority to China Application Serial Number 201610864000.5, filed Sep. 30, 2016, which is herein incorporated by reference.

BACKGROUND

Technical Field

The present disclosure relates to a display apparatus, especially to a waterproof display apparatus.

Description of Related Art

A display panel includes numerous electronic devices therein, and hence it may be damaged due to moisture. In order to protect these electronic devices against moisture, a common way is to adhere top and bottom waterproof films to top and bottom sides of the display panel, and to dispose waterproof glue on sidewalls of the display panel, so that the display panel can be waterproof.

When assembling a plurality of display panels into a large-sized display panel, a typical way is to adhere top and bottom waterproof films on each display panel, to dispose waterproof glue on all sidewalls of the display panels to enclose the display panel, and then to adjoin the bottom waterproof films together. However, apparent seams may be created among the display panels, and such seams are easily perceptible.

SUMMARY

Embodiments of the present disclosure provide a waterproof display apparatus, which either achieves waterproof ability or prevents seams thereof from being perceived by the user.

According to some embodiments of the present disclosure, a waterproof display apparatus includes a bottom waterproof structure, a plurality of driving substrates, a front panel laminate (FPL) and a top waterproof structure. The bottom waterproof structure has a first edge. The driving substrates are disposed on the bottom waterproof structure and defining a gap between adjacent driving substrates. The gap has opposite top and bottom portions. The FPL covers the driving substrates and includes a display medium layer therein. The top waterproof structure covers the FPL and has a second edge. The first and second edges are joined in a waterproof manner. The bottom portion of the gap is sealed by the bottom waterproof structure, and the top portion of the gap is sealed by the FPL or the top waterproof structure such that the gap is empty.

According to some embodiments of the present disclosure, a waterproof display apparatus includes a bottom waterproof structure, a plurality of driving substrates, an FPL and a top waterproof structure. The bottom waterproof structure has a first edge. The driving substrates are disposed on the bottom waterproof structure. The FPL covers the driving substrates and includes a display medium layer therein. The top waterproof structure covers the FPL and has a second edge. The first and second edges are joined in a waterproof manner, and a space between the driving substrates is free from a feature adhering the bottom waterproof structure and the FPL.

According to some embodiments of the present disclosure, a method of forming a waterproof display apparatus includes placing a plurality of driving substrates onto a bottom waterproof structure, placing at least one front panel laminate (FPL) onto the driving substrates, placing a top waterproof structure over the FPL, and joining edges of the top and bottom waterproof structures in a waterproof manner.

In the foregoing embodiments, the gap between the driving substrates is empty, or alternatively stated, the space between the driving substrates is free from a feature adhering the bottom waterproof structure and the FPL. As such, distance between the driving substrates can be shortened so as to reduce perceivability of seam of the driving substrates to naked eyes. Further, the driving substrates are located on the same bottom waterproof structure and covered by the top waterproof structure, the top and bottom waterproof structures are joined in a waterproof manner, and hence the top and bottom waterproof structures can prevent damage to the driving substrates and the FPL caused by moisture.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
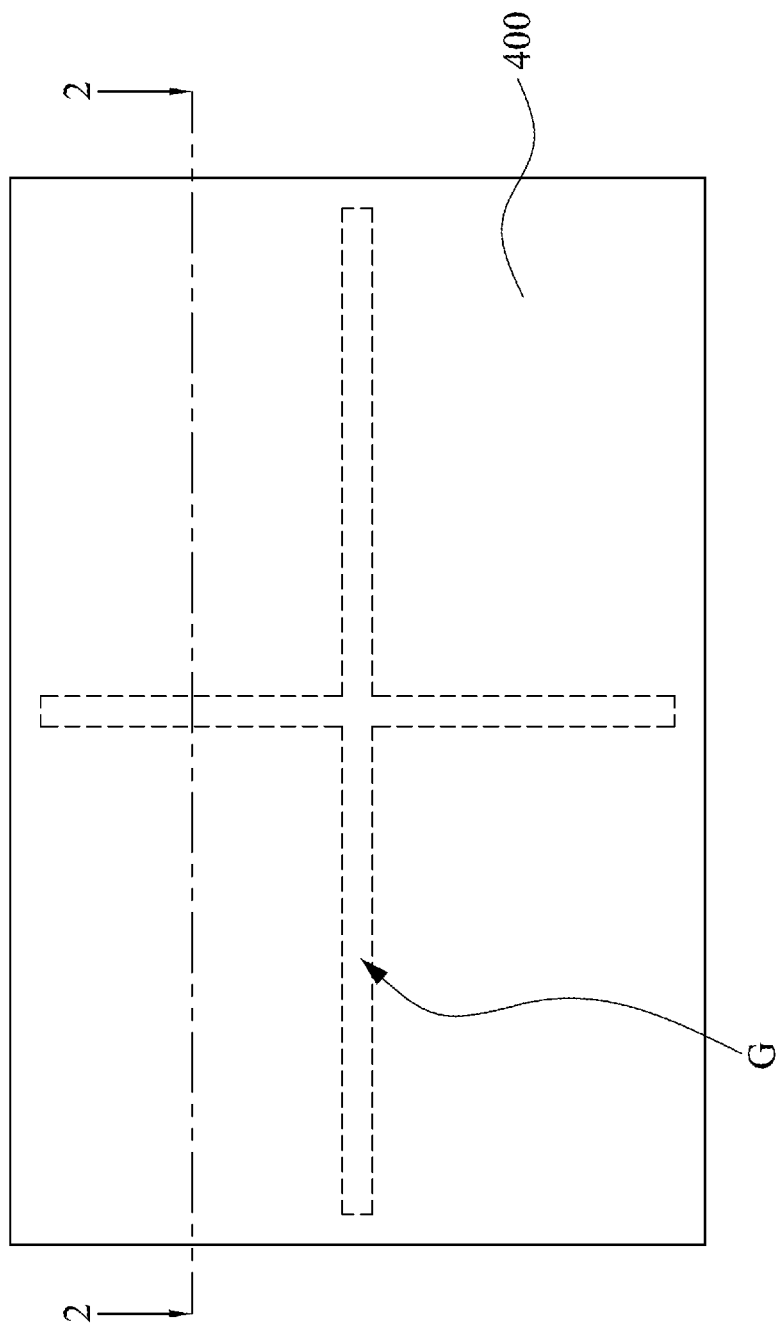
FIG. 1 is a top view of a waterproof display apparatus in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
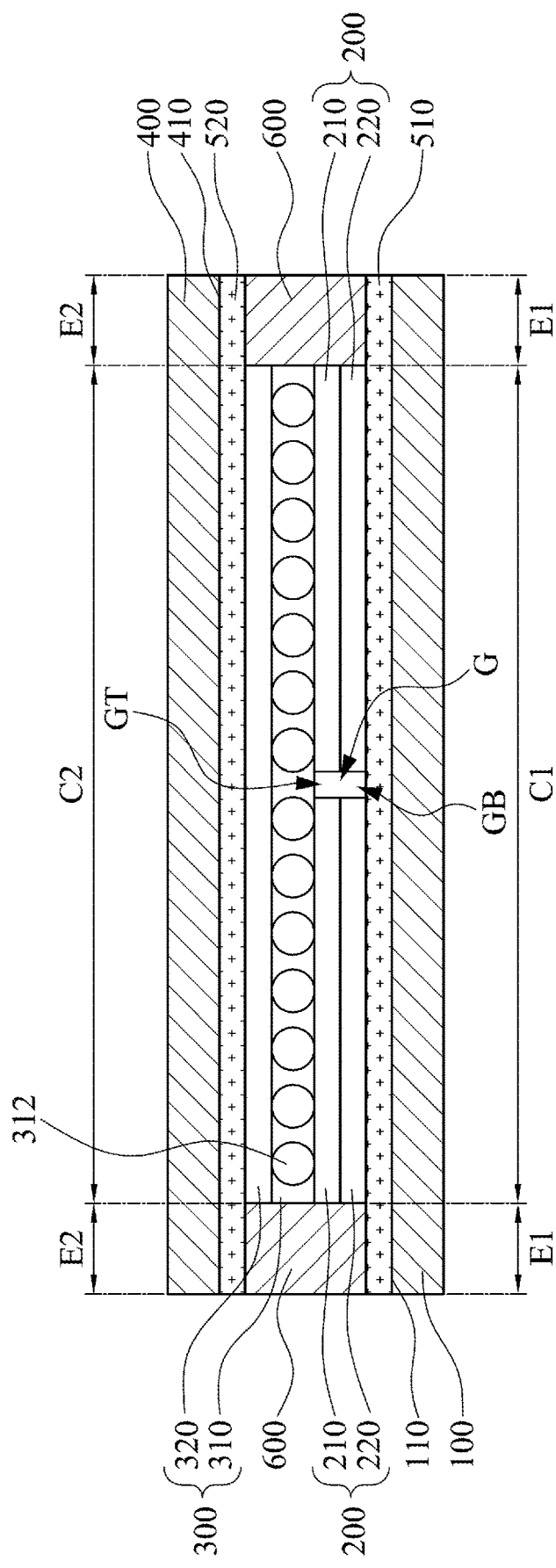
FIG. 2 is a cross-sectional view of the waterproof display apparatus taken along line 2-2 in FIG. 1.

FIG. 1 is a top view of a waterproof display apparatus in accordance with some embodiments of the present disclosure. FIG. 2 is a cross-sectional view of the waterproof display apparatus taken along line 2-2 in FIG. 1. As shown FIGS. 1 and 2, in the depicted embodiments, the waterproof display apparatus includes a bottom waterproof structure 100, a plurality of driving substrates 200, a front panel laminate (FPL) 300 and a top waterproof structure 400. The driving substrates 200 are collectively disposed on the bottom waterproof structure 100, so that these driving substrates 200 can be constrained by the same bottom waterproof structure 100 and are thus hard to move in a free manner. The FPL 300 covers these driving substrates 200 and is thus advantageous to constrain them as well. In other words, the FPL 300 and the driving substrates 200 are present between the bottom and top waterproof structures 100 and 400 and are therefore protected by waterproof abilities of the bottom and top waterproof structures 100 and 400. The bottom waterproof structure 100 has a first edge E1, and the top waterproof structure 400 has a second edge E2. The first and second edges E1 and E2 are joined in a waterproof manner, so that moisture induced damage to the driving substrates 200 and FPL 300 between the bottom and top waterproof structures 100 and 400 can be further mitigated. It is understood that "elements are joined in a waterproof manner" refers to that their joint strength is high enough to resist against normal pressured liquid or gas, so as to prevent normal pressured liquid or gas from penetrating therebetween.

The driving substrates 200 can be arranged side by side between the bottom waterproof structure 100 and the FPL 300, so as to benefit formation of large-sized display panel. Further, the driving substrates 200 are constrained by the bottom waterproof structure 100 and the FPL 300 and thus hard to freely move. Therefore, a space between the driving substrates 200 is free from a feature adhering the bottom waterproof structure 100 and the FPL 300, and hence distance between the driving substrates 200 can be shortened so as to reduce perceivability of seam of the driving substrates 200 to naked eyes. As such, the waterproof structure either improves waterproof ability or reduces perceivability of seam to naked eyes.

For example, during manufacture of the waterproof display apparatus, the driving substrates 200 can be arranged side by side in advance, and then, the FPL 300 can be adhered to the driving substrates 200. Due to that the driving substrates 200 are adhered to the same FPL 300, the driving substrates 200 can be constrained by the FPL 300 and are thus hard to freely move. Therefore, a space between the driving substrates 200 can be free from an adhesive feature. Afterwards, the bottom waterproof structure 100 can be adhered to bottom sides of the driving substrates 200, and the top waterproof structure 400 is adhered to top side of the FPL 300. As such, bottom sides of the driving substrates 200 can be adhered to the same bottom waterproof structure 100, and top sides of the driving substrates 200 can be adhered to the same FPL 300, so that the driving substrates 200 can be constrained by the same bottom waterproof structure 100 and the same FPL 300, and the driving substrates 200 are free from additional adhesive features therebetween. In other words, a space between the driving substrates 200 is free from a feature adhering the bottom waterproof structure 100 and the FPL 300, so as to reduce perceivability of seam of the driving substrates 200 to naked eyes.

In some embodiments, due to the fact that edges of the driving substrates 200 may be not geometrically matched, when these driving substrates 200 are arranged side by side, they may not tightly abut against each other. Therefore, the driving substrates 200 define a gap G therebetween. The gap G has opposite top portion GT and bottom portion GB. The bottom portion GB of the gap G is sealed by the bottom waterproof structure 100, and the top portion GT of the gap G is sealed by the FPL 300 such that the gap G is empty. The gap G is free from an adhesive feature therein. Stated differently, the bottom waterproof structure 100 covers bottom sides of the driving substrates 200 and thus seals the bottom portion GB of the gap G, and the FPL 300 covers top sides of the driving substrates 200 and thus seals the top portion GT of the gap G. Therefore, the driving substrates 200 can be constrained by the FPL 300 and the bottom waterproof structure 100, and the gap G is free from an adhesive feature, so that width of the gap G is shortened and thus reduces perceivability of seam of the driving substrates 200.

In some embodiments, the bottom waterproof structure 100 is monolithic (i.e. one-piece formed, formed in a single piece or integrally formed). The driving substrates 200 are adhered to the monolithic bottom waterproof structure 100. Such a monolithic structure is advantageous to improve waterproof ability of the bottom waterproof structure 100, so as to further prevent moisture induced damage to the overlying driving substrates 200 and the FPL 300. Alternatively stated, in some embodiments, the bottom waterproof structure 100 may include a top continuous surface 110. The driving substrates 200 are adhered to different regions of the top continuous surface 110. Top continuous surface 110 may mitigate moisture induced damage to the driving substrates 200 and the FPL 300. This is due to that the top continuous surface 110 is continuous without interruption and thus prevents moisture from penetrating through it. Therefore, waterproof ability of the bottom waterproof structure 100 can be improved. In some embodiments, material of the bottom waterproof structure 100 may be, for example, polyethylene terephthalate (PET), polycarbonate (PC), polymethylmethacrylate (PMMA) or other suitable light-permeable waterproof materials.

In some embodiments, the FPL 300 may include a display medium layer 310 and a common electrode layer 320. The display medium layer 310 covers the driving substrates 200, and the common electrode layer 320 covers the display medium layer 310. In other words, the display medium layer 310 can be present between the common electrode layer 320 and the driving substrates 200, so that the display medium layer 310 can be controlled by the common electrode layer 320 and the driving substrates 200, which will be discussed more specifically later. In some embodiments, the display medium layer 310 is continuous. The continuous display medium layer 310 is disposed on the driving substrates 200. More particularly, the driving substrates 200 are respectively adhered to different regions of the continuous display medium layer 310. For example, optically clear adhesive (OCA) can be disposed under the display medium layer 310 and adhere the display medium layer 310 and the driving substrates 200. Due to the fact that the display medium layer 310 is continuous without interruption and thus prevents moisture from penetrating though it, it can mitigate moisture induced damage to the driving substrates 200. Moreover, due to the fact that the display medium layer 310 is continuous without interruption, the display medium layer 310 can be free from seam, and hence appearance of the waterproof display apparatus can be improved.

A portion of the display medium layer 310 is present right above the gap G because the continuous display medium layer 310 covers the separated driving substrates 200. Stated differently, projections of the portion of display medium layer 310 and the gap G on the top continuous surface 110 of the bottom waterproof structure 100 are overlapped. As such, top portion GT of the gap G can be sealed by the display medium layer 310, so that the display medium layer 310 can prevent moisture from penetrating into the gap G. Further, due to fact that a portion of the display medium layer 310 is present right above the gap G between the driving substrates 200, the display medium layer 310 can space the top waterproof structure 400 and the gap G apart.

Therefore, a space between the driving substrates 200 is free from a feature adhering the top and bottom waterproof structures 400 and 100.

In some embodiments, the display medium layer 310 is a bi-stable display medium layer, such as an electrophoretic layer, as examples. In embodiments where the display medium layer 310 is an electrophoretic layer, it includes a plurality of microcapsules 312. Each microcapsule 312 includes a plurality of deep-colored charged particles and light-colored charged particles (not shown) therein. The charges of the deep-colored charged particles and the light-colored charged particles in each microcapsule 312 are different. Therefore, the deep-colored charged particles and light-colored charged particles can be attracted or repulsed by an electric field generated from pixel electrodes (not shown) of the driving substrates 200 and the common electrode layer 320, and hence move to particular positions to show an image. For example, the light-colored charged particles may be negatively charged, while the deep-colored charged particles may be positively charged. As a result, positions of the light-colored and the deep-colored charged particles in each microcapsule 312 can be controlled by an electric field generated from pixel electrodes of the driving substrates 200 and the common electrode layer 320.

In particular, the driving substrate 200 includes a thin film transistor (TFT) array structure 210 and a carrier 220. The TFT array structure 210 is disposed on the carrier 220. The TFT array structure 210 includes a plurality of TFTs arranged in an array. Each TFT is electrically connected to a pixel electrode. When charge type of the pixel electrode of the TFT array structure 210 changes, such as changing from positive charge to negative charge, light-colored or deep-colored charged particles in the microcapsule 312 above the pixel electrode move upwardly or downwardly in response to the changed charge type of the pixel electrode. When light above the display medium layer 310 travels into the microcapsule 312 and arrives at the light-colored charged particle, the light will be reflected by the light-colored charged particle. On the other hand, when the light travels into the microcapsule 312 and arrives at the deep-colored charged particle, the light will be absorbed by the deep-colored charged particle. As a result, user can see monochromatic images. In some embodiments, the FPL 300 can optionally include a color filter (not shown) to show full color images. In some embodiments, the carrier 220 is flexible to provide flexibility for the waterproof display apparatus.

In some embodiments, the top waterproof structure 400 is monolithic (i.e. one-piece formed, formed in a single piece or integrally formed). The FPL 300 is adhered to the monolithic top waterproof structure 400. Such a monolithic structure is advantageous to improve waterproof ability of the top waterproof structure 400, so as to mitigate moisture induced damage to the underlying FPL 300 and driving substrates 200. Alternatively stated, in some embodiments, the top waterproof structure 400 may include a bottom continuous surface 410. The FPL 300 is adhered to the bottom continuous surface 410. Because the bottom continuous surface 410 is continuous without interruption, it can prevent moisture from penetrating it and thus damaging the driving substrates 200 and FPL 300. In some embodiments, material of the top waterproof structure 400 may be, for example, polyethylene terephthalate (PET), polycarbonate (PC), polymethylmethacrylate (PMMA) or other suitable light-permeable waterproof materials.

In some embodiments, the waterproof display apparatus further includes an optical adhesive layer 510. The optical adhesive layer 510 is disposed between the driving substrates 200 and the bottom waterproof structure 100, so that the driving substrates 200 can be adhered to different regions of the top continuous surface 110 of the bottom waterproof structure 100. In some embodiments, the optical adhesive layer 510 is continuous, and the separated driving substrates 200 are adhered by the continuous optical adhesive layer 510. Due to the fact that the optical adhesive layer 510 is continuous without interruption, it can mitigate moisture induced damage to the overlying driving substrates 200 and FPL 300.

In some embodiments, the waterproof display apparatus further includes an optical adhesive layer 520. The optical adhesive layer 520 is disposed between the FPL 300 and the top waterproof structure 400, so that the FPL 300 can be adhered to the bottom continuous surface 410 of the top waterproof structure 400. In some embodiments, the optical adhesive layer 520 is continuous, and the continuous FPL 300 is adhered by the continuous optical adhesive layer 520. Due to the fact that the optical adhesive layer 520 is continuous without interruption, it can mitigate moisture induced damage to the underlying driving substrates 200 and FPL 300.

In some embodiments, the bottom waterproof structure 100 further includes a first central portion C1. The first central portion C1 is adjacent to the first edge E1. For example, the first central portion C1 is enclosed by the first edge E1. Similarly, the top waterproof structure 400 further includes a second central portion C2. The second central portion C2 is adjacent to the second edge E2. For example, the second central portion C2 is enclosed by the second edge E2. Driving substrates 200 and FPL 300 are present between the first and second central portions C1 and C2 and absent between the first and second edges E1 and E2. As a result, joint of the first and second edges E1 and E2 may not influence functions of the driving substrates 200 and FPL 300.

In some embodiments, joint of the first and second edges E1 and E2 may be achieved by additional waterproof adhesive structure. For example, the waterproof display apparatus further includes a waterproof adhesive structure 600. The waterproof adhesive structure 600 is disposed between the first and second edges E1 and E2, so that first and second edges E1 and E2 can be adhered by the waterproof adhesive structure 600. More particularly, the first edge E1 can be covered by a portion of the optical adhesive layer 510, and the bottom side of the waterproof adhesive structure 600 can be adhered to this portion of the optical adhesive layer 510. Similarly, the second edge E2 can be covered by a portion of the optical adhesive layer 520, and the top side of the waterproof adhesive structure 600 can be adhered to this portion of the optical adhesive layer 520. As such, the waterproof adhesive structure 600 can be fixed with the first and second edges E1 and E2. During manufacture of the waterproof display apparatus, the waterproof adhesive structure 600 is formed after bottom and top waterproof structures 100 and 400 are respectively adhered to the driving substrates 200 and FPL 300. For example, optical adhesive layers 510 and 520 can be respectively formed on the top and bottom continuous surfaces 110 and 410 of the bottom and top waterproof structures 100 and 400, and then, driving substrates 200 are placed on a portion of the optical adhesive layer 510 overlying the first central portion C1, and then, FPL 300 is adhered to the driving substrates 200, and then, the optical adhesive layer 520 under the second central portion C2 is placed on the FPL 300, and then, waterproof adhesive material is filled in gap between a portion of the optical adhesive layer 510 over the first edge E1 and a portion of the optical adhesive layer 520 under the second edge E2, so as to form waterproof adhesive structure 600. In other words, during formation of the waterproof adhesive structure 600, top portion GT and bottom portion GB of the gap G are respectively sealed by the FPL 300 and the bottom waterproof structure 100, and hence material of the waterproof adhesive structure 600 will not flow into the gap G. Therefore, a material of the waterproof adhesive structure 600 is absent in the gap G. In some embodiments, the material of the waterproof adhesive structure may be, but is not limited to, light-curable transparent adhesive, thermosetting transparent adhesive, or optically clear adhesive.

Figure 3A:
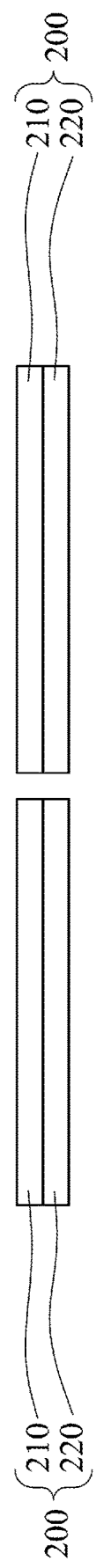
FIGS. 3A-3D illustrate cross-sectional views of intermediate states in the manufacturing of the waterproof display apparatus as shown in FIG. 2.
Figure 3B:
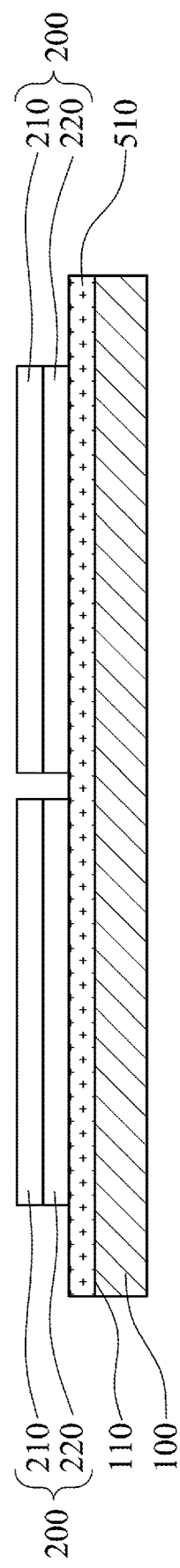

FIGS. 3A-3D illustrate cross-sectional views of intermediate states in the manufacturing of the waterproof display apparatus as shown in FIG. 2. As shown in FIG. 3A, driving substrates 200 are formed, wherein each driving substrate 200 includes a TFT structure 210 formed over a carrier 220 using suitable techniques, such as a series of deposition and patterning processes. Thereafter, the driving substrates 200 are placed onto a bottom waterproof structure 100, and the resulting structure is shown in FIG. 3B. For example, an optical adhesive layer 510 can be applied to the bottom waterproof structure 100 in advance, and the driving substrates 200 can be subsequently placed onto the optical adhesive layer 510.

Figure 3C:
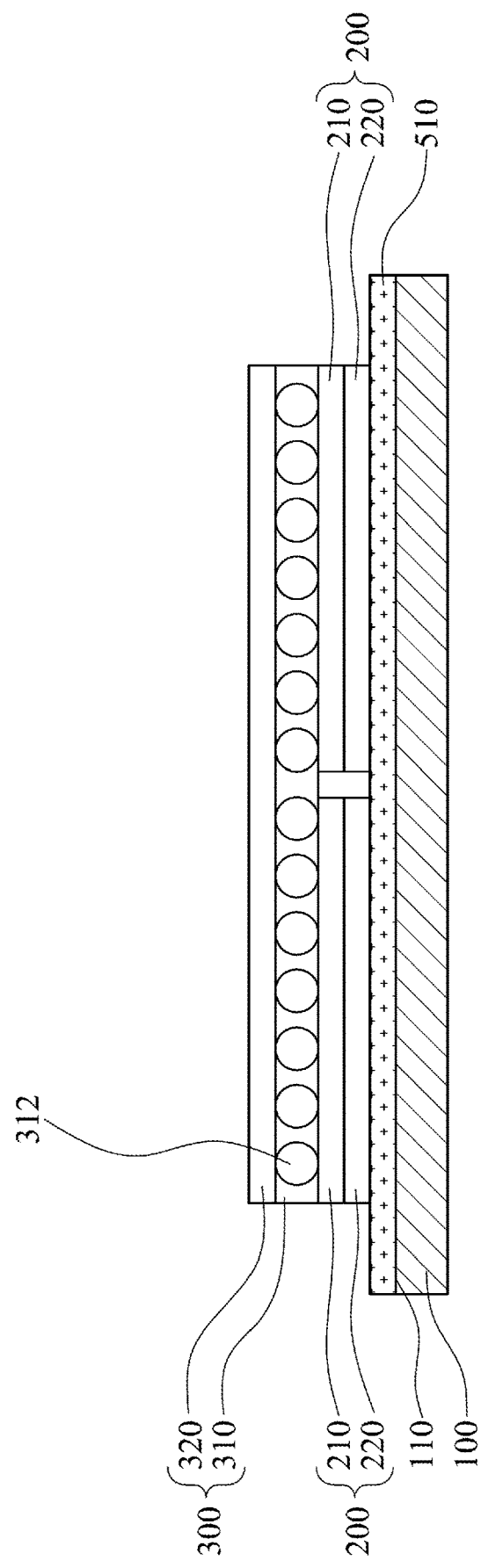

Afterwards, as shown in FIG. 3C, an FPL 300 is placed onto the driving substrates 200 such that the FPL 300 spans the driving substrates 200. In some embodiments, the FPL 300 can be adhered to the underlying driving substrates 200 by suitable adhesives (not shown).

Figure 3D:
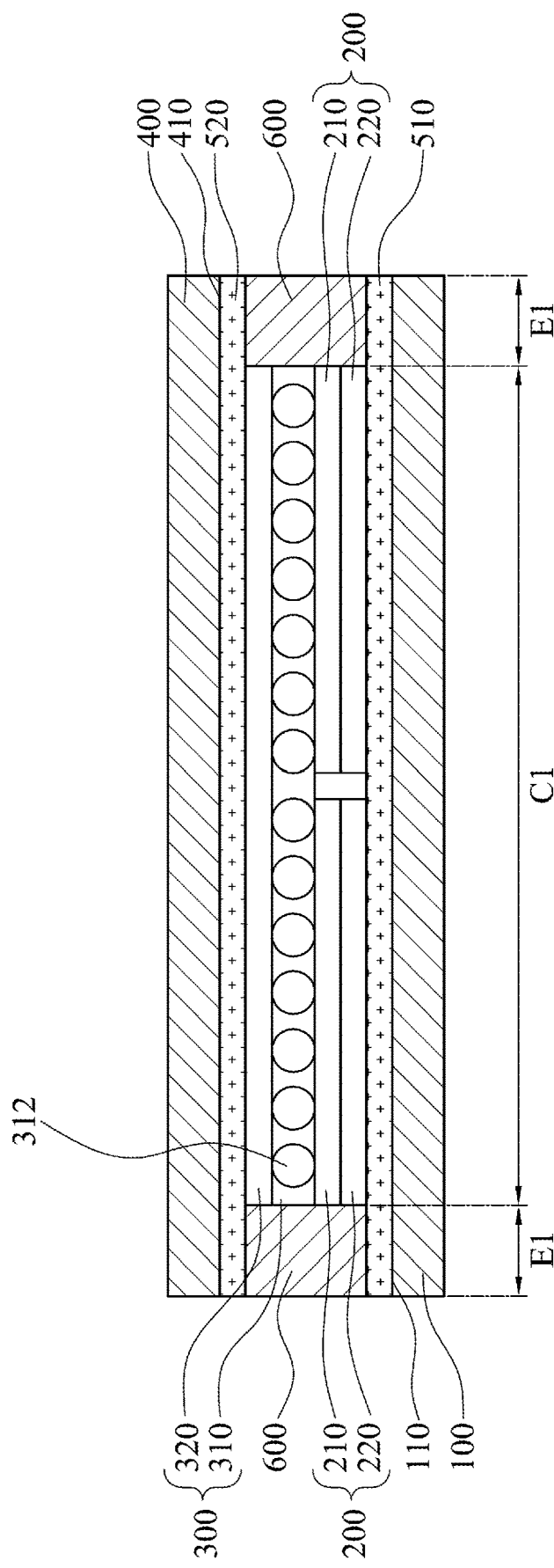

Thereafter, as shown in FIG. 3D, a top waterproof structure 400 is placed onto the FPL 300 such that the FPL 300 and the driving substrates 200 are present between the bottom and top waterproof structures 100 and 400. For example, an optical adhesive layer 520 can be applied to the top waterproof structure 400 in advance, and the top waterproof structure 400 is then adhered to the driving substrates 200 by the optical adhesive layer 520. Afterwards, the first edge E1 of the bottom waterproof structure 100 and the second edge E2 of the top waterproof structure 400 are joined in a waterproof manner. For example, waterproof adhesive can be applied to between the first and second edges E1 and E2 so as to form a waterproof adhesive structure 600 between the first and second edges E1 and E2.

In other embodiments, first and second edges E1 and E2 can be joined without additional waterproof adhesive structure. For example, referring to FIG. 4, which is a cross-sectional view of a waterproof display apparatus in accordance with some other embodiments of the present disclosure, the first and second edges E3 and E4 of the bottom and top waterproof structures 100a and 400a are merged without additional waterproof adhesive material therebetween. For example, at least one of the bottom and top waterproof structures 100a and 400a includes hot melt material, such as hot melt adhesive. Therefore, the first and second edges E3 and E4 of the bottom and top waterproof structures 100a and 400a can be merged using a thermal process. For example, the bottom waterproof structure 100a includes hot melt material, and the top waterproof structure 400a does not include hot melt material, according to some embodiments; the bottom waterproof structure 100a does not include hot melt material, and the top waterproof structure 400a includes hot melt material, according to some embodiments; the bottom and top waterproof structures 100a and 400a include hot melt materials in some embodiments. It is understood that in embodiments where the bottom and top waterproof structures 100a and 400a include the same material, the first and second edges E3 and E4 are merged free from distinguishable interface to naked eyes. On the other hand, when the bottom and top waterproof structures 100a and 400a have different materials, the first and second edges E3 and E4 are merged with distinguishable interface to naked eyes.

In embodiments where the bottom waterproof structure 100a includes hot melt material, the driving substrates 200 spaced apart by the gap G can be directly adhered to the top continuous surface 110a of the bottom waterproof structure 100a. In other words, additional adhesive material is absent between the driving substrates 200 and the top continuous surface 110a, and the driving substrates 200 and the top continuous surface 110a are adhered by hot melting of the bottom waterproof structure 100a. Similarly, in embodiments where the top waterproof structure 400a includes hot melt material, the FPL 300 can be directly adhered to the bottom continuous surface 410a of the top waterproof structure 400a. In other words, additional adhesive material is absent between the FPL 300 and the bottom continuous surface 410a, and the FPL 300 and the bottom continuous surface 410a are adhered by hot melting of the top waterproof structure 400a.

Figure 4:
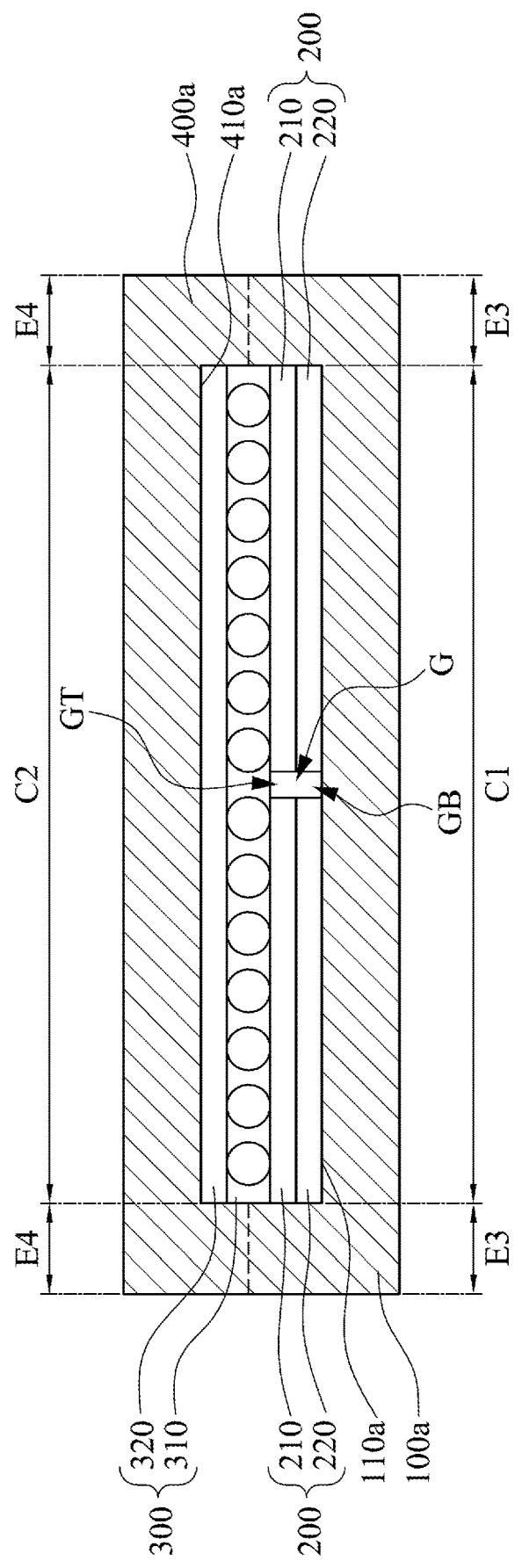
FIG. 4 is a cross-sectional view of a waterproof display apparatus in accordance with some other embodiments of the present disclosure.

Other features shown in FIG. 4 are the same as that are shown in FIGS. 1 and 2 and corresponding context. Therefore, other features shown in FIG. 4 are not described repeatedly.

Figure 5:
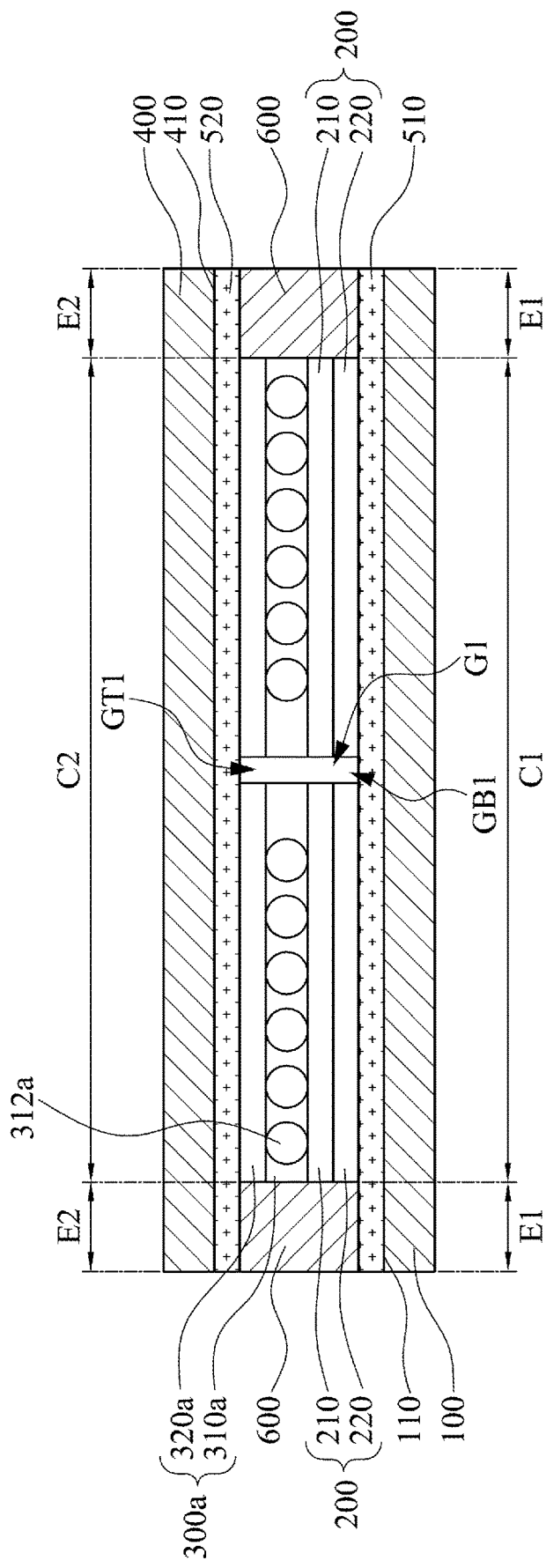
FIG. 5 is a cross-sectional view of a waterproof display apparatus in accordance with some other embodiments.

FIG. 5 is a cross-sectional view of a waterproof display apparatus in accordance with some other embodiments of the present disclosure. As shown in FIG. 5, the waterproof display apparatus includes a plurality of FPLs 300a. The FPLs 300a are respectively adhered to the driving substrates 200. Therefore, the gap G1 spacing the driving substrates 200 apart can extend to between the FPLs 300a and spaces the FPLs 300a apart. Due to the fact that the driving substrates 200 are constrained by the underlying bottom waterproof structures 100 and thus hard to freely move, the FPLs 300a respectively adhered to the driving substrates 200 are constrained by the driving substrates 200 and thus hard to freely move as well. As such, a space between the driving substrates 200 is free from a feature adhering the bottom waterproof structure 100 and FPL 300a. Stated differently, a space between the FPLs 300a is free from a feature adhering the bottom waterproof structure 100 and FPLs 300a. More particularly, space between the substrates 200 and space between the FPLs 300a are free from feature adhering the bottom and top waterproof structures 100 and 400. As a result, width of the gap G1 can be shortened for reducing perceivability of either seam of the FPLs 300a or seam of the driving substrates 200 to naked eyes.

Moreover, the separated FPLs 300a can be adhered to the same top waterproof structure 400 and can therefore be constrained by the top waterproof structure 400. In other words, top and bottom sides of the FPLs 300a can be respectively constrained by the top waterproof structure 400 and driving substrates 200, and hence the FPLs 300a are hard to freely move. Therefore, the gap G1 can be empty and free from a feature adhering the top and bottom waterproof structures 400 and 100, so that width of the gap G1 can be shortened.

More particularly, bottom portion GB1 of the gap G1 is sealed by the bottom waterproof structure 100, and top portion GT1 of the gap G1 is sealed by the top waterproof structure 400, so that the gap G1 can be empty and free from adhesive feature. In other words, the bottom waterproof structure 100 can cover bottom sides of the driving substrates 200 and thus seal bottom portion GB1 of the gap G1, the top waterproof structure 400 can cover top sides of the FPLs 300a and thus seal top portion GT1 of the gap G1. As such, the driving substrates 200 and FPLs 300a can be constrained by the bottom and top waterproof structures 100 and 400, so that the gap G1 can be free from a feature adhering the bottom and top waterproof structures 100 and 400. Therefore, perceivability of either seam of the driving substrates 200 or seam of the FPLs 300a can be reduced.

In some embodiments, the separated FPLs 300a are adhered to monolithic top waterproof structure 400. That is, the separated FPLs 300a can be adhered to different regions of the bottom continuous surface 410 of the top waterproof structure 400. Because the bottom continuous surface 410 is continuous without interruption, the bottom continuous surface 410 can prevent moisture from penetrating through it into the gap G1, so that moisture induced damage to FPLs 300a and driving substrates 200 can be mitigated.

Similar to foregoing FPL 300, each FPL 300a shown in FIG. 5 may also include a display medium layer 310a and a common electrode layer 320a covering the display medium layer 310a. The display medium layer 310a of the FPL 300a includes a plurality of microcapsules 312a. These microcapsules 312a include a plurality of deep-colored charged particles and light-colored charged particles (not shown) therein. In other words, the display medium layer 310a of each FPL 300a is an electrophoretic layer. In some embodiments, the FPL 300a includes wiring feature (not shown) between the display medium layer 310a and the gap G1. This wiring feature does not show images and thus may form dark zones in a displayed image. However, because the gap G1 is free from a feature adhering the bottom waterproof structure 100 and FPLs 300a, the gap G1 can be free from a feature adhering the bottom waterproof structure 100 and the wiring feature, so that width of the gap G1 can be reduced. Therefore, even if, in some embodiments, wiring features on opposite sides of the gap G1 collectively form a dark zone across the gap G1, the narrow gap G1 can reduce width of the dark zone, so as to improve appearance of the display apparatus.

Other features shown in FIG. 5 are the same as that are shown in FIGS. 1 and 2 and corresponding context. Therefore, other features shown in FIG. 5 are not described repeatedly.

Figure 6A:
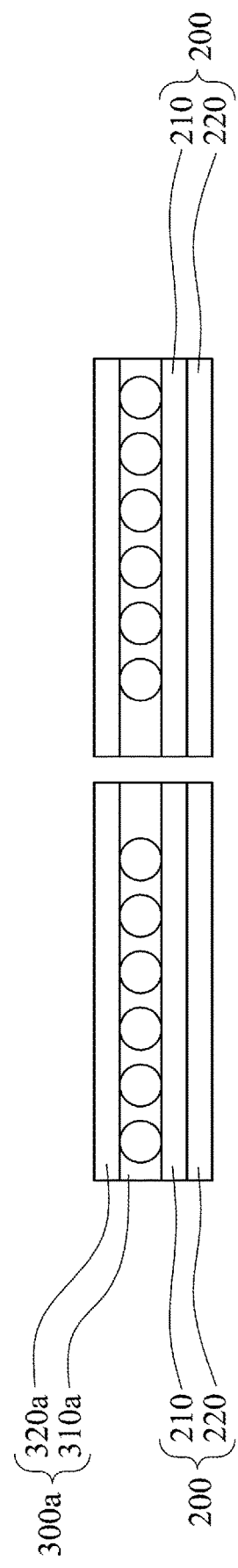
FIGS. 6A-6C illustrate cross-sectional views of intermediate states in the manufacturing of the waterproof display apparatus as shown in FIG. 5.
Figure 6B:
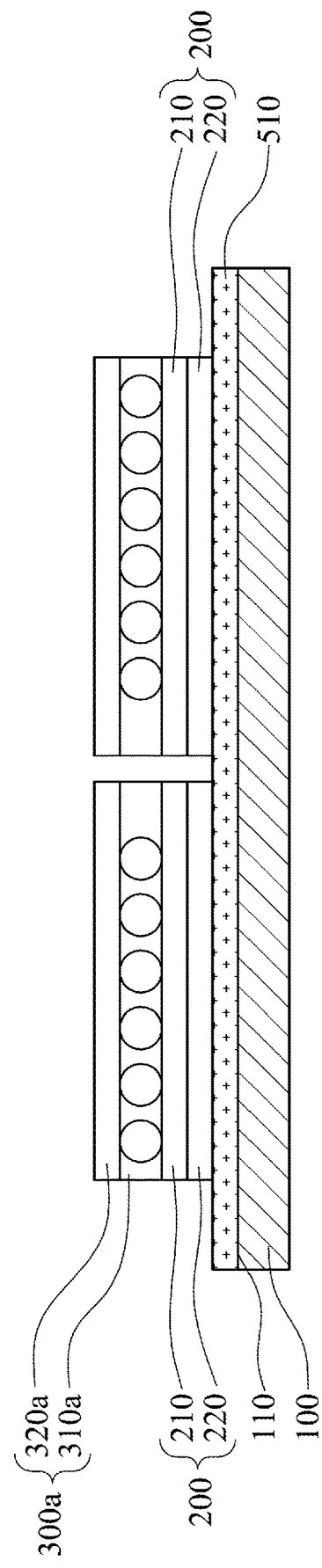
Figure 6C:
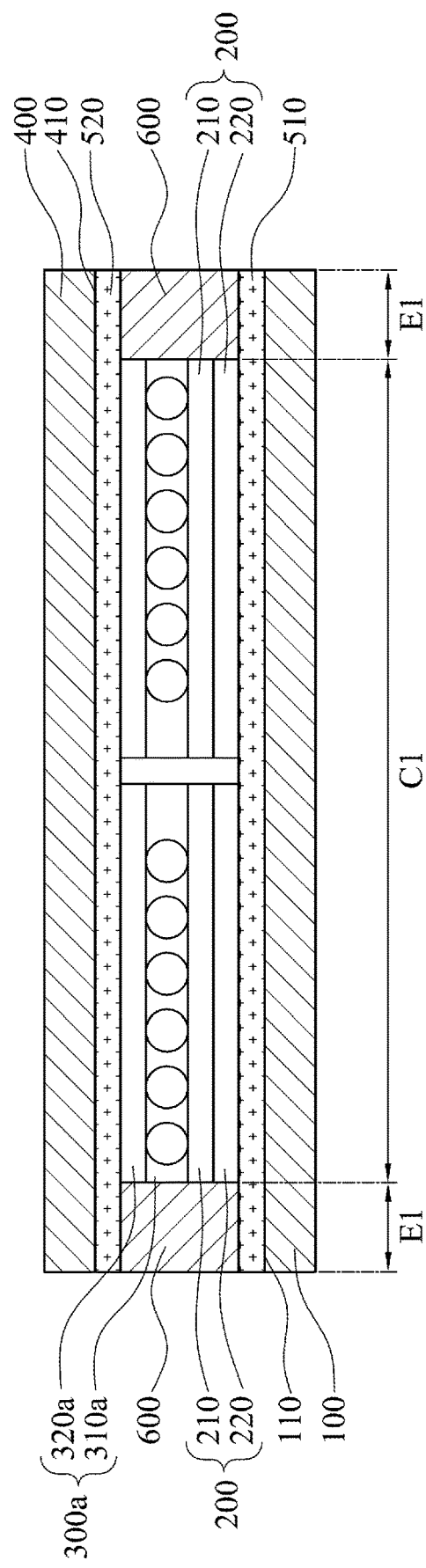

FIGS. 6A-6C illustrate cross-sectional views of intermediate states in the manufacturing of the waterproof display apparatus as shown in FIG. 5. As shown in FIG. 6A, driving substrates 200 are formed, wherein each driving substrate 200 includes a TFT structure 210 formed over a carrier 220 using suitable techniques, such as a series of deposition and patterning processes. Next, FPLs 300a are respectively placed onto the driving substrates 200. In some embodiments, the FPLs 300a can be adhered to the underlying driving substrates 200 by suitable adhesives (not shown).

Thereafter, the driving substrates 200 with FPLs 300 thereon are placed onto a bottom waterproof structure 100, and the resulting structure is shown in FIG. 6B. For example, an optical adhesive layer 510 can be applied to the bottom waterproof structure 100 in advance, and the driving substrates 200 with FPLs 300 thereon can then be placed onto the optical adhesive layer 510.

Afterwards, as shown in FIG. 6C, a top waterproof structure 400 is placed over the FPLs 300 such that the top waterproof structure 400 spans the FPLs 300. For example, an optical adhesive layer 520 can be applied to the top waterproof structure 400 in advance, and then, the top waterproof structure 400 is adhered to the FPLs 300a by the optical adhesive layer 520. Afterwards, the first edge E1 of the bottom waterproof structure 100 and the second edge E2 of the top waterproof structure 400 are joined in a waterproof manner. For example, waterproof adhesive can be applied to between the first and second edges E1 and E2 so as to form a waterproof adhesive structure 600 between the first and second edges E1 and E2.

Figure 7:
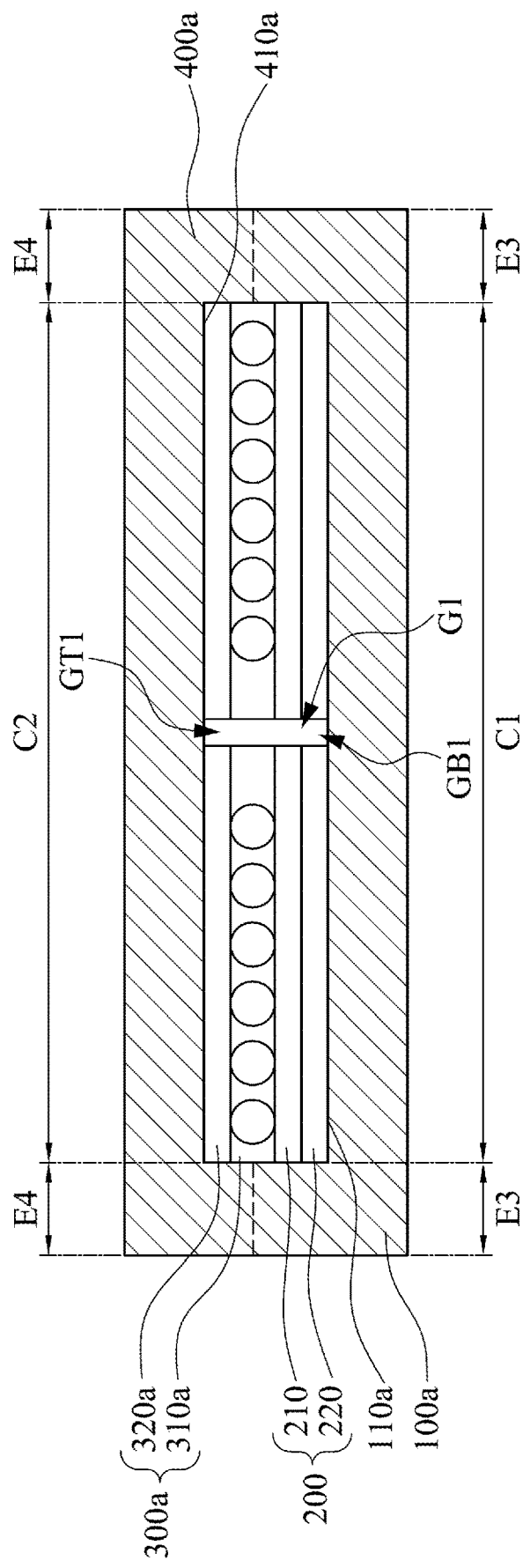
FIG. 7 is a cross-sectional view of a waterproof display apparatus in accordance with some other embodiments of the present disclosure.

FIG. 7 is a cross-sectional view of a waterproof display apparatus in accordance with some other embodiments of the present disclosure. Main difference between the depicted embodiments and that of FIG. 5 includes that the first and second edges E3 and E4 of the bottom and top waterproof structures 100a and 400a are merged without additional waterproof adhesive material therebetween. For example, at least one of the bottom and top waterproof structures 100a and 400a includes hot melt material, such as hot melt adhesive. Therefore, the first and second edges E3 and E4 of the bottom and top waterproof structures 100a and 400a can be merged using a thermal process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A waterproof display apparatus, comprising:
a bottom waterproof structure having a first edge;
a plurality of driving substrates disposed on the bottom waterproof structure and defining a gap between adjacent driving substrates, the gap having opposite top and bottom portions, wherein each of the driving substrates comprises a thin film transistor array structure and a carrier which are vertically stacked, and the gap is defined between adjacent stacks of the thin film transistor array structure and the carrier of the driving substrates;
a front panel laminate (FPL) covering the driving substrates and comprising a display medium layer therein; and
a top waterproof structure covering the FPL and having a second edge, wherein the first and second edges are joined in a waterproof manner, the bottom portion of the gap is sealed by the bottom waterproof structure, and the top portion of the gap is sealed by the FPL or the top waterproof structure such that the gap is empty.

2. The waterproof display apparatus of claim 1, wherein the display medium layer is continuous, and the continuous display medium layer is disposed on the driving substrates.

3. The waterproof display apparatus of claim 1, wherein a portion of the display medium layer is present right above the gap.

4. The waterproof display apparatus of claim 1, wherein the bottom waterproof structure comprises a top continuous surface, and the driving substrates are respectively adhered to different regions of the top continuous surface.

5. The waterproof display apparatus of claim 1, wherein the FPL is plural, the gap extends to between the FPLs and spaces the FPLs apart, the top waterproof structure comprises a bottom continuous surface, and wherein the FPLs are respectively adhered to different regions of the bottom continuous surface.

6. The waterproof display apparatus of claim 1, wherein the bottom waterproof structure is formed in a single piece, and the driving substrates are adhered to the bottom waterproof structure.

7. The waterproof display apparatus of claim 1, wherein the FPL is plural, the gap extends to between the FPLs and spaces the FPLs apart, the top waterproof structure is integrally formed, and wherein the FPLs are adhered to the integrally formed top waterproof structure.

8. The waterproof display apparatus of claim 1, further comprising:
a waterproof adhesive structure disposed between the first edge of the bottom waterproof structure and the second edge of the top waterproof structure, and a material of the waterproof adhesive structure is absent in the gap.

9. The waterproof display apparatus of claim 8 wherein:
the bottom waterproof structure has a top continuous surface extending along a horizontal direction, and the first edge of the bottom waterproof structure extends from an outermost boundary of the bottom waterproof structure inwardly a predetermined first distance along the horizontal direction;
the top waterproof structure has a bottom continuous surface extending along the horizontal direction, and the second edge of the top waterproof structure extends from an outermost boundary of the top waterproof structure inwardly a predetermined second distance along the horizontal direction; and
the waterproof adhesive structure extends between the first edge of the bottom waterproof structure and the second edge of the top waterproof structure.

10. The waterproof display apparatus of claim 9, wherein the waterproof adhesive structure extends horizontally from an area corresponding to the outermost boundary of the bottom waterproof structure to outermost boundaries of the driving substrates, and further extends horizontally from an area corresponding to the outermost boundary of the top waterproof structure to an outermost boundary of the front panel laminate.

11. The waterproof display apparatus of claim 1, wherein the first edge of the bottom waterproof structure and the second edge of the top waterproof structure are merged.

12. The waterproof display apparatus of claim 1, wherein the carrier of each of the driving substrates is flexible.

13. A waterproof display apparatus, comprising:
a bottom waterproof structure having a first edge;
a plurality of driving substrates disposed on the bottom waterproof structure;
a front panel laminate (FPL) covering the driving substrates and comprising a display medium layer therein; and
a top waterproof structure covering the FPL and having a second edge, wherein the first and second edges are joined in a waterproof manner, a space between the driving substrates is free from a feature adhering the bottom waterproof structure and the FPL, and the space is empty, each of the driving substrates comprises a thin film transistor array structure and a carrier which are vertically stacked, and the space is defined between adjacent stacks of the thin film transistor array structure and the carrier of the driving substrates.

14. The waterproof display apparatus of claim 13, wherein the display medium layer is continuous, and the continuous display medium layer is adhered to the driving substrates.

15. The waterproof display apparatus of claim 13, wherein the FPL is plural, the FPLs are respectively adhered to the driving substrates, the top waterproof structure is formed in a single piece, and wherein the FPLs are adhered to the top waterproof structure.

16. The waterproof display apparatus of claim 13, wherein the bottom waterproof structure is formed in a single piece, and the driving substrates are adhered to the bottom waterproof structure.

17. The waterproof display apparatus of claim 13, further comprising:
a waterproof adhesive structure adhering the first edge of the bottom waterproof structure and the second edge of the top waterproof structure.

18. The waterproof display apparatus of claim 13, wherein at least one of the bottom waterproof structure and the top waterproof structure includes a hot melt material.

19. A method of forming a waterproof display apparatus, comprising:
placing a plurality of driving substrates onto a bottom waterproof structure such that a gap is defined between adjacent driving substrates, the gap has opposite top and bottom portions, wherein each of the driving substrates comprises a thin film transistor array structure and a carrier which are vertically stacked, and the gap is defined between adjacent stacks of the thin film transistor array structure and the carrier of the driving substrates;
placing at least one front panel laminate (FPL) onto the driving substrates;
placing a top waterproof structure over the FPL, and the gap is sealed by the FPL or the top waterproof structure such that the dap is empty; and
joining edges of the top and bottom waterproof structures in a waterproof manner.

20. The method of claim 19, wherein the joining comprises:
applying a waterproof adhesive to between the edges of the top and bottom waterproof structures.

21. The method of claim 19, wherein the joining comprises:
merging the edges of the top and bottom waterproof structures.

22. The method of claim 21, wherein the merging comprises a thermal process.

23. The method of claim 19, wherein the placing the at least one FPL onto the driving substrates comprises:
placing a plurality of the FPLs respectively onto the driving substrates.

* * * * *